United States Patent [19]

Spisak

[11] E Re. 29,710

[45] Reissued Jul. 25, 1978

[54] WHEEL AND GREASE CAP ASSEMBLY

[76] Inventor: Edward G. Spisak, 35700 Oakwood La., Westland, Mich. 48185

[21] Appl. No.: 792,031

[22] Filed: Apr. 28, 1977

Related U.S. Patent Documents

Reissue of:

[64] Patent No.: 3,998,494
Issued: Dec. 21, 1976
Appl. No.: 560,997
Filed: Mar. 21, 1975

[51] Int. Cl.[2] ..... B60B 7/00

[52] U.S. Cl. ..... 301/37 P; 301/108 R

[58] Field of Search ..... 301/37 R, 37 P, 37 C, 301/37 CD, 37 TP, 37 PB, 37 B, 108 R, 108 A; 40/20 A; 24/73 HC

[56] References Cited

U.S. PATENT DOCUMENTS

| | | | |
|---|---|---|---|
| 1,896,066 | 2/1933 | Brown | 301/108 R |
| 1,944,658 | 1/1934 | Griffith | 301/108 R |
| 2,042,416 | 5/1936 | Weindel | 40/20 A |
| 3,669,501 | 6/1972 | Derleth | 301/37 P |
| 3,823,982 | 7/1974 | Spisak | 301/37 R |
| 3,918,762 | 11/1975 | Hampshire | 301/37 R |

*Primary Examiner*—Robert B. Reeves
*Assistant Examiner*—H. Grant Skaggs
*Attorney, Agent, or Firm*—Fisher, Gerhardt & Groh

[57] ABSTRACT

A wheel and grease cap combination in which a plastic covered portion on a vehicle wheel is provided with a radially inwardly facing annular groove positioned adjacent to an opening in the wheel for receiving the grease cap and radially inwardly of the bolt circle for receiving bolts to attach the wheel to the axle hub. The groove receives a plurality of attaching means formed on the grease cap which deflect radially inwardly upon attachment and detachment of the grease cap. The attaching portions firmly engage the bottom of the groove to prevent both axial and rotational displacement of the grease cap relative to the wheel.

3 Claims, 6 Drawing Figures

Fig-1
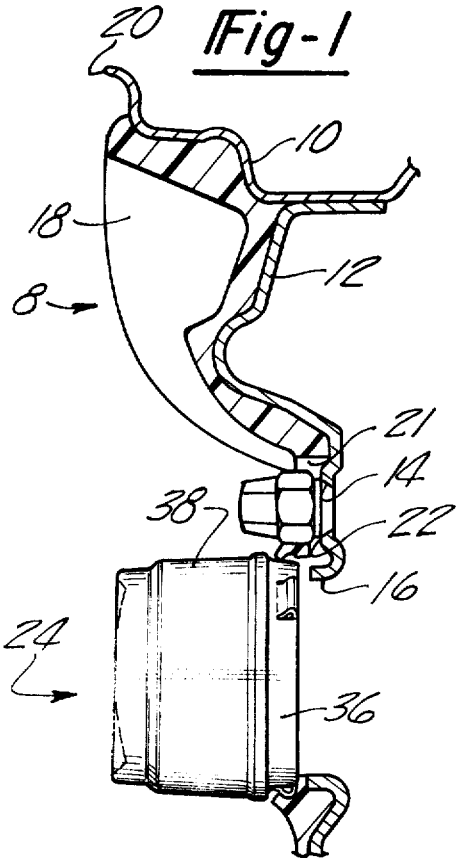
Fig-2
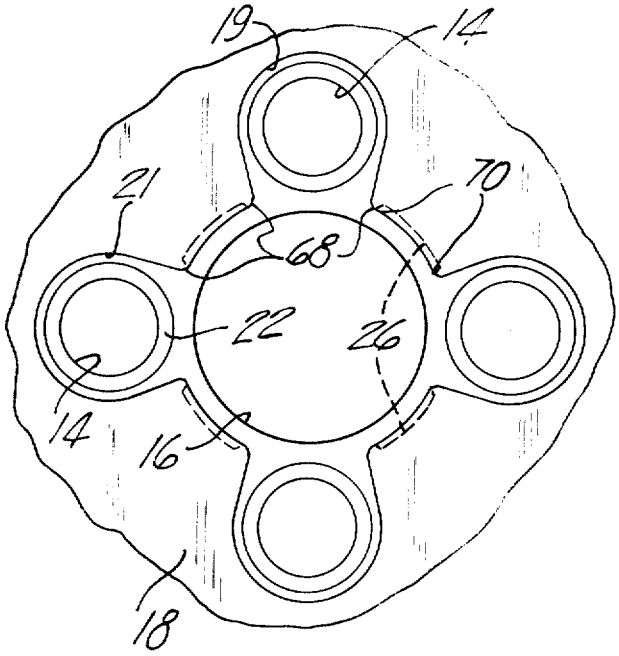
Fig-4
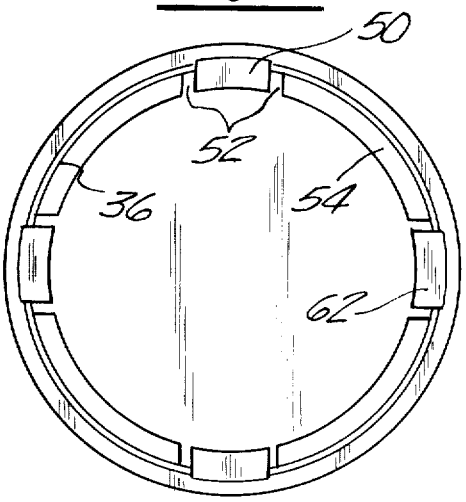
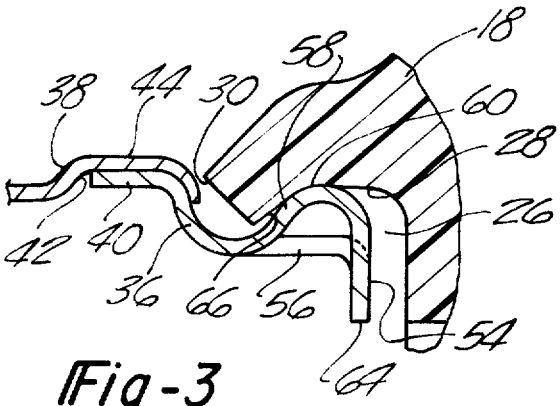
Fig-3
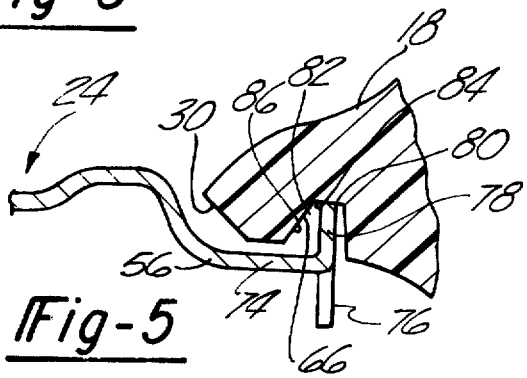
Fig-5
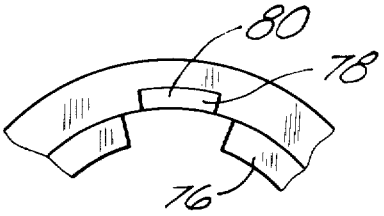
Fig-6

WHEEL AND GREASE CAP ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to vehicle wheels and more particularly to a wheel and grease cap combination.

It has been practiced to simulate cast metal wheels or other types of ornamental wheels in which a conventional metal wheel having a metal tire supporting rim and a wheel body or disc attached to the rim, is covered with a plastic cover molded directly on or otherwise bonded or attached to the wheel and simulating the cast metal features or other ornamental aspects of a wheel. In some instances, it is desirable that the bolts or nuts which secure the wheel to the hub be exposed to take advantage of their decorative aspects. In such constructions the plastic cover extends radially inwardly of the circle of bolts or nuts, leaving little room for the provision of the attachment of a grease cap or hubcap.

Prior attachment of grease caps have usually required an axially extending metal member attached to the wheel and provided with means for receiving the grease cap or hubcap. However, such constructions are complicated and expensive to manufacture.

In addition to the problem of having very little space available between the wheel attaching bolts or nuts and the wheel opening receiving the wheel hub, it is necessary that the grease cap be retained in a manner preventing its axial displacement or removal due to the various problems of wheel distortion and dimensional change particularly during operation on curves and rough road surfaces. For this purpose it is necessary not only that the hubcap be prevented from moving axially relative to the wheel, but also that it be prevented from rotation relative to the wheel as a result of the inertial loads imposed during acceleration and deceleration of the vehicle.

SUMMARY OF THE INVENTION

It is an object of the invention to provide a wheel and grease cap assembly which can be attached to the plastic cover portion of the wheel radially inwardly of the wheel attaching nuts or bolts.

It is a further object of the invention to provide a plastic covered wheel and grease cap assembly in which novel attaching means retain the grease cap on the plastic wheel cover in a centered relationship and in a manner which prevents both axial and circumferential movement of the cap relative to the wheel.

A plastic covered wheel and hubcap assembly is provided in which the plastic cover portion forms a radially inwardly facing groove which receives resiliently deflectable attaching portions on the hubcap, which are engaged in the groove to prevent axial displacement of the grease cap relative to the wheel. The attaching portions also provide edge portions which engage the groove surface to prevent relative rotation between the cap and the wheel.

DESCRIPTION OF THE DRAWING

FIG. 1 is a sectional view of a portion of the wheel and grease cap assembly embodying the invention;

FIG. 2 is a plan view with parts broken away showing a central portion of the wheel structure;

FIG. 3 is a sectional view at an enlarged scale of a portion of the wheel and grease cap assembly shown in FIG. 1;

FIG. 4 is a view of the grease cap removed from the wheel;

FIG. 5 is a view similar to FIG. 3, but showing another embodiment of the invention; and FIG. 6 is a view similar to FIG. 4 but showing only a portion of the grease cap.

DETAILED DESCRIPTION

Referring now to the drawings, and particularly to FIGS. 1 and 2, the wheel and the grease cap assembly 8 embodying the invention includes a drop center, tire receiving rim 10 attached to a metal disc or body member 12. The disc 12 has a plurality of bolt or stud receiving openings 14, through which bolts or studs can extend to secure the wheel to the hub of a vehicle in a conventional manner. The bolt holes 14 lie on an annular circle spaced slightly radially outward from an opening 16 in the wheel disc 12 which receives the hub or axle portion.

To provide a low cost wheel having an attractive appearance and simulating more expensive cast type wheels, the rim 10 and disc 12 are made conventionally of metal and a plastic cover portion 18 is molded or otherwise attached to the wheel rim 10 and wheel disc 12. As indicated, the plastic portion 18 extends from near the circumferential outer lip 20 of the tire rim 10 radially inward to the edge of the hub receiving opening 16 in the wheel disc 12. The plastic portion 18 may be made of any suitable plastic material such as a polyurethane.

The plastic portion 18 in the area of the bolt or stud receiving openings 14 is cut away to form recesses 21 so that the annular surface 22 of the wheel disc 12 surrounding the stud or bolt openings 14 are exposed. When the wheel is attached to the hub of a vehicle the bolts or studs may seat directly on the circumferential metal portion 22 and still remain exposed to view.

To provide for attachment of the grease cap 24 without the need to provide a special metal attaching structure to the wheel disc 12, an annular groove segment 26 is provided between each of the adjacent bolt or stud receiving openings 14. The groove segments 26 form an annular inwardly facing groove, which is interrupted at each one of the bolt or stud receiving openings 14.

As best seen in FIG. 3 the groove segments 26 have a radially inwardly facing bottom surface 28 adjacent to an angularly disposed guide or cam surface 30 which faces radially inwardly and axially outwardly of the wheel disc 12.

As best seen in FIGS. 1, 3 and 4 the grease cap 24 includes a retaining ring 36 and a cup shaped cap portion 38 securely mounted on the retaining ring 36. Preferably, the retaining ring 36 is made of a relatively hard spring-like material whereas, the cap portion 38 can be made of more decorative materials such as chrome plated metal or plastic.

As best seen in FIG. 3, the retaining ring 36 has a radially outer axially extending flange portion 40 which is adapted to be captured in a groove 42 formed by a radially outer annular lip or bearing 44 formed in the cup shaped cap portion 38. The flange 44 fits tightly within the groove 42 to prevent relative axial or circumferential movement between the cap portion 38 and the retaining ring 36 which together form a unitary hubcap 24.

The retaining ring 36 of the hubcap 24 is provided with a plurality of attaching portions 50 which are equally spaced from each other. Preferably a minimum of three such attaching means 50 are provided on the retaining ring 36 to insure that when the hubcap 24 is mounted on the wheel, it is maintained in a centered relationship relative to the axis of the wheel. As seen in FIG. 4, however, four attaching means 50 are shown in diametrically opposed relation to each other.

The attaching means 50 are formed integrally with and formed part of the retaining ring 36. Each attaching means 50 is formed by spaced slits 52 extend through a radially inwardly extending flange portion 54 and an axially extending *annular* flange portion 56 adjacent the open end of the hubcap 24. The material between the slits 52 is bent radially outwardly as at 58 and merges with a radius portion indicated at 60 which in turn merges with a radially inwardly disposed prongs 62, the radially inner edge 64 of which is coextensive with the radial inner edge of the flange 54. The retaining ring is made of a spring-like material so that the portion 58, radius portion 60 and prong 62 are resiliently deflectable relative to the remainder of the retaining ring 36.

As viewed in FIGS. 3 and 4, the retaining means 50 have the radius portion 60 extending radially outwardly beyond the outer circumference formed by the intermediate flange 56 and as best seen in FIG. 3 these portions are disposed within the groove segment 26 formed in the plastic cover portion 18.

To attach the grease cap 24 to the wheel assembly the cap is placed in axial alignment with the wheel with the radius portions 60 in engagement with the cam surface 30 forming part of the plastic cover portion 18. Axial inward movement of the hubcap 24 serves to deflect the attaching portions 50 radially inward and after the attaching portions 50 pass over the cam surface 30, they spring back into position so that the radius portion 60 are seated on the bottom surface 28 of the groove 26. Removal of the hubcap 24 is accomplished by inserting a flat tool, such as a screw driver, between the cam surface 30 and hubcap 24 and by a prying action moving the hubcap axially outwardly. Axial movement of the hubcap 24 serves to bring the flange portion 58 into engagement with a surface 66 which acts as a cam to deflect the attaching portions 50 radially inwardly so that the cap may be removed from the wheel.

An alternate method of attaching and detaching the grease cap 24 from the wheel of the vehicle is achieved by disposing the cap 24 relative to the wheel so that the attaching portions 50 are disposed between adjacent groove segments 26 with the radius portion 60 in annular alignment with the segmented grooves 26. Thereafter, the grease cap 24 may be rotated in either direction relative to the wheel. Upon relative rotation of the grease cap 24 and the wheel, the attaching means 50 engage rounded cam surfaces 68 formed between the groove segments 26 and the bolt receiving recesses 21 formed in the plastic cover member 18 so that the attaching portions 50 are deflected radially inwardly relative to the grease cap. When the grease cap has been rotated sufficiently to bring the attaching portion 50 into alignment with the groove segments 26, the attaching portion 50 will spring back to their original position to exert a radially outward force on the bottom portion 28 of the groove 26 to resist relative rotation and axial movement of the grease cap 24 relative to the wheel.

Removal of the grease cap 24 also may be accomplished by rotating the grease cap 24 relative to the wheel, in which case the attaching portions 50 engage cam surfaces 70 formed at the ends of the groove segments 26, to guide the attaching portions during inward deflection of the latter. When the grease cap 24 has been rotated so that the attaching portions 50 are disposed intermediate adjacent groove segments 26, the grease cap 24 is separate from the wheel and may be removed. It will be understood that in addition to the spring pressure exerted by the attaching portion 50 against the bottoms of the grooves 26, relative rotation of the grease cap 24 and wheel is resisted by the cam surfaces 70.

Referring now to FIG. 5, another embodiment of the invention is illustrated. In this embodiment of the invention, the grease cap 72 is formed of a single piece of material. In this instance, *axially extending annular flange or* attaching portions 74 are formed in a manner similar to the previously described embodiment in that annularly spaced slits 75 are formed to extend through [an axially] *a radially* extending flange 76. The axial outer end of the flange 76 is bent radially outwardly to form a finger portion 78 having a radial outer edge 80 adapted to be disposed in an annular groove 82 formed in the plastic portion 18 of the wheel with the edge 80 in biting engagement with the bottom 84 of the groove 82. In this case the groove 82 has a slightly different cross section than the groove 26 but is formed in annular segments.

The embodiment of the invention shown in FIGS. 5 and 6 may be attached and detached from the wheel in the same manner as the embodiments shown in FIGS. 1 through 4. In other words, the grease cap 72 may be attached by axial movement relative to the wheel so that the prongs or fingers 78 engage the cam surfaces 30 upon attachment of the grease cap. Upon detachment, the fingers 78 engage cam surfaces 86 forming a wall of the groove 82. The grease cap 72 also may be attached and detached by disposing the grease cap with the attaching portions 74 disposed between the adjacent segmented grooves 82 so that rotation of the grease cap 72 cams the finger portion 78 into the segmented grooves 80. Upon removal of the grease cap by rotation, cam surfaces such as the cam surfaces 70 at the ends of the segmented grooves 26 serve to deflect the attaching portion 78 radially inwardly so that rotation of the cap moves the attaching portion out of the grooves.

Although the embodiments of the invention have been described in terms of groove segments 26 and 82 which extend annularly between recesses 19 for receiving wheel attaching bolts, the grooves also could be formed in a continuous annular form. In that instance, the grease caps 24 and 72 in both embodiments of the invention, is attached and detached by relative axial movement of the grease cap relative to the wheel.

A wheel and grease cap combination has been provided in which a plastic cover portion on a wheel is provided with a radially inwardly facing annularly disposed groove which is disposed adjacent to the opening in the wheel for receiving the hub and radially inwardly of the bolt circle for the bolts attaching the wheel to the hub. The groove receives a plurality of attaching means formed on the grease cap which deflect radially inwardly upon attachment and detachment from the wheel and which firmly engage the bottom of the groove to prevent axial displacement and relative rotation between the grease cap and wheel.

The embodiments of the invention in which an exclusive property or privilege is claimed are defined as follows:

1. A wheel and grease cap assembly including a metal wheel having wheel mounting holes arranged on an annular circle and a plastic member attached to and covering the wheel, said plastic member having a portion extending radially inward of said circle and between said mounting holes and having an inner annular surface adjacent said circle, an annular groove formed in said inner annular surface and having a radially inward facing bottom portion, a cap attached to said plastic member and having [a retaining ring] *an annular flange portion* axially extending inside of said inner annular surface of said plastic member, said cap having a plurality of circumferentially spaced attaching portions formed on said [retaining ring] *annular flange portion* and located in said annular groove, said attaching portions being deflectable relative to said cap for resiliently restraining removal of said cap from said plastic member, said attaching portions presenting outer radius portions engageable with said bottom portion of said annular groove to retard relative rotation of said cap and said wheel, said annular groove being formed of segments with one segment extending between adjacent mounting holes of said wheel, a cam surface formed in said plastic member circumferentially adjacent to opposite ends of each of said segments of said groove and at the exterior thereof to engage and simultaneously deflect said grease cap relative to said wheel during attachment of said grease cap to said wheel.

2. The combination of claim 1 in which additional cam surfaces are formed at the ends of each of said segments of said groove, said additional cam surface engaging and simultaneously deflecting said attaching portions radially inwardly upon rotation of said grease cap relative to said wheel from an [attahced] *attached* position in which said attaching portions are disposed in said groove.

3. The combination of claim 1 in which said plastic portion forms guide surfaces adjacent said groove facing radially inwardly and axially outwardly, said attaching portions being engageable with said guide surfaces to deflect said attaching portions radially inwardly relative to said cap upon axial movement of said cap relative to said wheel for guiding said attaching portions into said groove during attachment of said cap to said wheel.

* * * * *

UNITED STATES PATENT AND TRADEMARK OFFICE

CERTIFICATE OF CORRECTION

PATENT NO. : RE 29710

DATED : July 25, 1978

INVENTOR(S) : Edward G. Spisak

It is certified that error appears in the above-identified patent and that said Letters Patent are hereby corrected as shown below:

Column 3, line 14, after "52" add "which"

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*